United States Patent Office 3,558,558
Patented Jan. 26, 1971

3,558,558
CURABLE MIXTURES OF EPOXIDE RESINS AND ALKYL SUBSTITUTED UREAS
Daniel Porret, Binningen, and Juergen Habermeier, Allschwill, Switzerland, assignors to Ciba Limited, Basel, Switzerland, a company of Switzerland
No Drawing. Filed Oct. 6, 1969, Ser. No. 864,157
Claims priority, application Switzerland, Oct. 11, 1968, 15,239/68
Int. Cl. C08g 30/14
U.S. Cl. 260—47          8 Claims

ABSTRACT OF THE DISCLOSURE

Hot-curable moulding, coating and adhesive compositions which are storage-stable at room temperature and which contain a polyepoxide compound, for example a liquid polyglycidyl ether of bisphenol A and, as a latent curing agent, a $C_1$–$C_4$-alkylurea, for example N-monomethylurea, N,N'-dimethylurea or tetramethylurea. As a rule 0.2–0.7 mol of alkylurea are used per epoxide equivalent. In order to obtain perfect castings, the cure should be carried out stepwise by gradual warming, with the mixtures being exposed to gradually rising temperatures in the range of 100–180° C., and the temperature must, especially in the range of 120–150° C., only be raised in small steps.

---

U.S.A. patent specifications Nos. 3,386,955 and 3,386,956 describe curable adhesive mixtures which contain an epoxide resin and, as latent curing agents, aromatic-aliphatic-substituted ureas and bisureas, for example 1,1'-(4-methyl-m-phenylene)-bis-(3,3-diethylurea). These known curable mixtures are admittedly storage-stable at room temperature but react so strongly exothermically already at moderately elevated curing temperatures that they can only be considered for those technical applications where very thin layers are to be cured (adhesives, lacquers and the like). Against this, our own experiments have shown that because of the strong reactivity of the aromatic-substituted urea derivatives mentioned it is not possible, even at the relatively low curing temperatures recommended in the U.S.A. patent specifications mentioned, to obtain mouldings or castings with measurable mechanical strengths. Strongly discoloured castings permeated by many gas bubbles are obtained, and these castings are as a rule already destroyed on removal from the mould.

U.S.A. patent specification No. 3,294,749 further describes curable mixtures which contain an epoxide resin, a poly-carboxylic acid anhydride as the curing agent as well as inter alia aliphatically or cycloaliphatically N-substituted urea derivatives in catalytic amounts as cure accelerators. Example IV of this U.S.A. patent specification shows that a mixture of 4 grams of epoxide resin (registered trade name Epon 828) and 0.4 gram of N,N'-dicyclohexylurea after warming to 150° C. for 72 hours shows no signs of gelling, whilst this same mixture cures within less than 15 minutes after an addition of dodecenylsuccinic anhydride.

This necessarily caused the expert to hold the prejudice that ureas N-substituted by alkyl or cycloalkyl groups are by themselves totally ineffective as curing agents for epoxide resins.

Our own experiments have confirmed that N,N'-dicyclohexylurea is unsuitable for use as a curing agent for usual epoxide resins (for example diomethane diglycidyl ether) both because of its low reactivity and also because of its poor compatibility.

Surprisingly, it was however found that $C_1$–$C_4$-alkylureas in contrast to N,N'-dicycloalkylurea are not only effective latent curing agents for epoxide resins but that when using them the cure reaction can, in contrast to the aromatically substituted ureas or bisureas, be well controlled by suitable programming of the curing cycle, even in the case of higher layer thicknesses, so that castings with outstanding mechanical properties are obtained.

Furthermore the castings which have been manufactured by curing a mixture of an epoxide resin, such as for example diomethane-diglycidyl ether, and a $C_1$–$C_4$-alkylurea as the latent curing agent, show, in comparison to castings which have been manufactured from known curable mixtures of the same epoxide resin and a polycarboxylic acid anhydride as the hot curing agent, better mechanical properties, above all higher flexural strengths and impact strengths, and a higher deflection, coupled with good electrical properties and approximately the same heat distortion point according to Martens (DIN).

The subject of the present invention are thus storage-stable hot-curable mixtures which are suitable for the manufacture of mouldings, impregnations, coatings and adhesive bonds and which are characterised in that they contain (a) a polyepoxide compound with, on average, more than one vicinal epoxide group in the molecule; and (b) as the curing agent, an alkylurea of formula

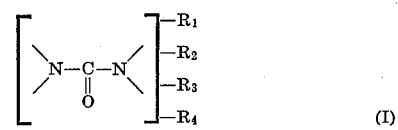

(I)

wherein $R_1$ denotes a lower alkyl group with 1 to 4 carbon atoms and $R_2$, $R_3$ and $R_4$ each represent a hydrogen atom or an alkyl group with 1 to 4 carbon atoms.

As alkylureas of Formula I there may for example be mentioned: N-methylurea, N-ethylurea, N-propylurea, N-isopropylurea, N-tert.-butylurea, N,N-dimethylurea, N,N-diethylurea, N,N-dipropylurea, N,N-di-n-butylurea, N-methyl-N-ethylurea, N,N'-dimethylurea, N,N'-diethylurea, N,N'-di-isopropylurea, N,N'-di-tert.-butylurea, N-butyl-N'-tert.-butylurea, N,N-dimethyl - N' - ethylurea and N,N,N',N'-tetramethylurea.

Preferably, alkylureas of Formula I wherein at least two of the residues $R_1$–$R_4$ denote a $C_1$–$C_4$-alkyl group are used. Derivatives in which the alkyl group is a methyl or ethyl residue are as a rule particularly suitable for use as curing agents.

Appropriately, 0.2 to 0.7 mol, preferably 0.3 to 0.5 mol, of the alkylurea (b) are used per 1 equivalent of epoxide groups of the polyepoxide compounds (a).

Possible polyepoxide compounds (a) are above all those with an average of more than one glycidyl group, β-methylglycidyl group or 2,3-epoxycyclopentyl group bonded to a hetero-atom (for example sulphur, preferably oxygen or nitrogen); compounds to be especially mentioned are bis(2,3-epoxycyclopentyl) ether; diglycidyl ethers or polyglycidyl ethers of polyhydric aliphatic alcohols such as 1,4-butanediol, or polyalkylene glycols, such as polypropane glycols; diglycidyl ethers or polyglycidyl ethers of cycloaliphatic polyols, such as 2,2-bis(4-hydroxycyclohexyl)propane; diglycidyl ethers or polyglycidyl ethers of polyhydric phenols such as resorcinol, bis(p-hydroxyphenyl)-methane, 2,2 - bis(p - hydroxyphenyl)-propane (=diomethane), 2,2-bis(4'-hydroxy-3',5'-dibromophenyl)propane and 1,1,2,2-tetrakis-(p-hydroxyphenyl)ethane, or of condensation products of phenols with formaldehyde obtained under acid conditions such as phenolnovolacs and cresol-novolacs; di- or poly-(β-methylglycidyl) ethers of the above-mentioned polyhydride alcohols or polyhydric phenols; polyglycidyl esters of polybasic carboxylic acids such as phthalic acid, terephthalic acid Δ⁴-tetrahydrophthalic acid and hexahydrophthalic acid; N-glycidyl derivatives of amines, amides and heterocyclic nitrogen bases such as N,N-diglycidyl-aniline, N,N-diglycidyl-toluidine, and N,N,N',N'-tetraglycidyl-bis-(p-aminophenyl) - methane; triglycidyl-isocyanurate; N,N'-diglycidyl-ethyleneurea; N,N'-diglycidyl - 5,5 - dimethyl-hydantoin, N,N'-diglycidyl - 5 - isopropyl-hydantoin and N,N'-digylcidyl-5,5-dimethyl-6-isopropyl-5,6-dihydro-uracil.

If desired, active diluents such as for example styrene oxide, butyl glycidyl ether, isooctyl glycidyl ether, phenyl glycidyl ether, cresyl glycidyl ether and glycidyl esters of synthetic highy branched mainly tertiary aliphatic monocarboxylic acids ("Cardura E") can be added to the polyepoxides to lower the viscosity.

When curing the curable mixtures according to the invention to give mouldings and the like, special precautionary measures must as a rule be observed. An appropriate procedure is to mix the polyepoxide compound (a) at 80–120° C. with 0.2–0.7 mol (preferably 0.3 to 0.5 mol) of the alkylurea (b) per epoxide equivalent of the polyepoxide compound and to pour the resulting mixture into prewarmed moulds.

The mixtures are stable for days at the temperatures mentioned. The cure is effected by stepwise gradual warming over a longer period of time, and in particular as a rule by exposing the mixture to gradually rising temperatures in the range of 100–180° C., preferably in the range of 120–170° C.

At the same time it is particularly important that the temperature should above all between 120 and 150° C. only be raised in small steps.

The following general temperature program has proved very advantageous for the curing process, it being possible for the optimum curing times to vary within the specified ranges depending on the nature of the alkylurea chosen, of the polyepoxide compound and of the mutual quantity ratio:

(1) Preliminary reaction: Hours
    (a) 110–120° C. _____ ½–24
  +(b) 120–130° C. _____ ½–24
  +(c) 130–140° C. _____ ½–24

This is followed by complete cure:

(2) Complete cure:
    (a) 140–150° C. _____ ½–40
  +(b) 150–160° C. _____ ½–50
  +(c) 160–170° C. _____ ½–50

The very long times mentioned as the upper limit for the preliminary reaction are in most cases not required but can be employed without disadvantage; in the complete cure, the longer reaction times in most cases give optimum properties.

Slowly raising the temperature in several stages is necessary because the cure reaction (which is frequently very slow at temperatures of 100–140° C.) takes place spontaneously with decomposition if temperatures of 130–170° C. become established too soon.

Such an uncontrolled cure leads above all in the case of thicker layers or mouldings to faulty or partly decomposed products, or produces mouldings with enclosed gas bubbles.

During the first curing stage ("preliminary reaction") which takes place slowly, the constituents produced at the lower temperatures mentioned by decomposition of the curing agent can then react continuously with the epoxide groups without producing an excessive exothermic effect.

The curable mixtures which have in this way been subjected to a preliminary reaction at the lower temperatures are then sufficiently stable at the higher temperatures required for complete cure or faster gelling (140–170° C.) for no uncontrollable cure reaction to take place any longer.

The mechanism of cure is presumably complex. The alkylureas which act as latent curing agents are obviously gradually decomposed as the cure reaction starts. It is known that ureas yield amines and oxazolidinones with epoxides. It is further known that ureas can be thermally decomposed into an amine and an isocyanate. It can therefore be assumed that the cure takes place on the one hand by polyaddition of amines to the polyepoxide compounds and on the other hand by the amine-catalysed polymerisation of epoxide groups, and furthermore the isocyanates can react with epoxides to give oxazolidinones.

The cure can, if desired, first be stopped after the "preliminary reaction" carried out at low temperature (100–140° C.), with a curable precondensate which is still fusible and soluble (a so-called "B-stage") being obtained if the polyexopide compound and alkylurea are appropriately chosen.

Such a precondensate as a rule has good storage stability and can for example serve for the manufacture of "prepregs," compression moulding compositions or sintering powders.

In order to shorten the gelling or cure times, known basic cure accelerators, for example tertiary amines, quatery ammonium bases, quaternary ammonium salts, alkali hydroxides or especially alkali alcoholates, for example sodium hexanetriolate, can be added.

The term "cure" as used here denotes the conversion of the soluble, either liquid or fusible, polyepoxides into solid, insoluble and infusible, three-dimensionally cross-linked products or materials, and in particular as a rule with simultaneous shaping to give mouldings such as castings, pressings, laminates and the like or "two-dimensional structures" such as coatings, lacquer films or adhesive bonds.

The curable mixtures, according to the invention, of polyepoxide compounds (a) and alkylureas of Formula I as curing agents can furthermore be mixed in any stage before the cure with usual modifiers such as extenders, fillers and reinforcing agents, pigments, dyestuffs, organic solvents, plasticisers, flow control agents, agents for conferring thixotropy, flameproofing substances, or mould release agents.

As extenders, reinforcing agents, fillers and pigments which can be employed in the curable mixtures according to the invention there may for example be mentioned: coal tar, bitumen, textile fibres, glass fibres, asbestos fibres, boron fibres, carbon fibres, cellulose, polyethylene powder, polypropylene powder; quartz powder; mineral silicates such as mica, asbestos powder, slate powder; kaolin, aluminium oxide trihydrate, chalk powder, a gypsum, antimony trioxide, bentones, silica aerogel ("Aerosil"), lithopone, baryte, titanium dioxide, carbon black, graphite, oxide colours such as iron oxide, or metal powders such as aluminium powder or iron powder.

Suitable organic solvents for modifying the curable mixtures are for example toluene, xylene, n-propanol, butyl acetate, acetone, methyl ethyl ketone, diacetone-alcohol, ethylene glycol monomethyl ether, monoethyl ether and monobutyl ether.

Dibutyl, dioctyl and dinonyl phthalate, tricresyl phosphate, trixylenyl phosphate and also polypropylene glycols can for example be employed as plasticisers for modifying the curable mixtures.

Silicones, cellulose acetobutyrate, polyvinyl butyral, waxes, stearates and the like (which are in part also employed as mould release agents) can be added as flow control agents when using the curable mixtures, especially in surface protection.

Especially for use in the lacquer field, the polyepoxide compounds can furthermore be partially esterified in a known manner with carboxylic acids such as especially higher unsaturated fatty acids. It is furthermore possible to add other curable synthetic resins, for example phenoplastics or aminoplastics, to such lacquer resin formulations.

The curable mixtures according to the invention can be manufactured in the usual manner with the aid of known mixing equipment (stirrers, kneaders, rolls and the like).

The curable epoxide resin mixtures according to the invention are above all employed in the fields of surface protection, the electrical industry, laminating processes and building. They can be used, in each case in a suitable formulation for the special end use, in the unfilled or filled state, optionally in the form of solutions or emulsions, as paints, lacquers, sintering powders, compression moulding compositions, injection moulding formulations, dipping resins, casting resins, impregnating resins, binders and adhesives, tool resins, laminating resins, sealing and filling compositions, floor covering compositions and binders for mineral aggregates.

In the examples which follow the parts denote parts by weight and the percentages denote percentages by weight unless otherwise stated. The relationship of parts by volume to parts by weight is as of the millilitre to the gram.

The following epoxide resin was used for the manufacture of curable mixtures described in the examples:

EPOXIDE RESIN A

Polyglycidyl ether resin (technical product) which is liquid at room temperature, manufactured by condensation of diomethane (2,2-bis-(p-hydroxyphenyl)-propane) with a stoichiometric excess of epichlorhydrin in the presence of alkali, and mainly consisting of diomethane-diglycidyl ether of formula $$CH_2\text{---}CH\text{---}CH_2\text{---}O\text{---}\underset{}{\underset{}{\bigcirc}}\text{---}\underset{CH_3}{\overset{CH_3}{\underset{|}{C}}}\text{---}\underset{}{\underset{}{\bigcirc}}\text{---}O\text{---}CH_2\text{---}CH\text{---}CH_2$$
$$\underset{O}{\diagdown\diagup}\qquad\qquad\qquad\qquad\qquad\qquad\qquad\underset{O}{\diagdown\diagup}$$

having the following characteristic data—epoxide content: 5.1–5.5 epoxide equivalents/kg.; viscosity (Hoeppler) at 25° C.: 9000–13,000 cp.

In order to determine the mechanical and electrical properties of the curable mixtures described in the examples which follow, sheets of 135 x 135 x 4 mm. were manufactured for determining the flexural strength, deflection, impact strength and water absorption. The test specimens (60 x 10 x 4 mm.) for determining the water absorption and for the flexural and impact test (VSM 77,103 and VSM 77,105) were machined from the sheets.

Test specimens of dimensions 120 x 15 x 10 mm. were in each case cast for determining the heat distortion point according to Martens (DIN 53,458).

In order to examine the arcing resistance and the tracking resistance (VDE 0303), sheets of dimensions 120 x 120 x 4 mm. were cast.

EXAMPLE 1

100 g. of epoxide resin A (liquid diomethane-diglycidyl ether with an epoxide content of 5.25 epoxide equivalents/kg. and a viscosity at 25° C. of about 9500 cp.) and 11.7 g. of N,N'-dimethylurea (corresponding to a ratio of equivalents of epoxide groups to mols of urea derivative=1:0.25) are homogeneously mixed at 100° C. and the resulting mixture (sample 1) is poured into aluminium moulds prewarmed to 100° C. The cure takes place in accordance with the following temperature program: 20 hours 100° C.+2 hours 120° C.+3 hours 130° C.+1 hour 140° C.+16 hours 160° C.

In a parallel experiment, the above mentioned mixture (sample 1) is kept at 100° C. for a prolonged period. Hereupon no gelling is as yet observed even after 2 days.

For comparison, a known curable mixture (sample 2) is manufactured from 61 g. of epoxide resin A and 61 g. of an anhydride mixture which is liquid at room temperature and contains 9 parts of phthalic anhydride, 13 parts of Δ⁴ tetrahydrophthalic anhydride, 78 parts of hexahydrophthalic anhydride and 15 parts of cresylglycid. This comparison mixture is cured for 5 hours at 120° C. and 15 hours at 150° C.

When this known curable mixture (sample 2) is kept for 7 hours at 115–120° C. in a parallel experiment, the occurrence of gelling is then observed.

Table 1 which follows contains the properties of castings obtained with sample 1 according to the invention and with the known sample 2.

TABLE 1

| | Sample 1 | Sample 2 |
|---|---|---|
| Flexural strength, kg./mm.², VSM 77,103 | 16.0 | 13–15 |
| Deflection, mm., VSM 77,103 | 13.3 | 8.8 |
| Impact strength, cm. kg./cm.², VSM 77,103 | 25 | 10–15 |
| Heat distortion point according to Martens, °C., DIN 53,458 | 79 | 78–85 |
| Arcing resistance, level, VDE 0303 | L4 | L4 |
| Tracking resistance, level, VDE 0303 | KA3c | KA3c |

EXAMPLE 2

0.3 ml. of a solution of 0.82 part of sodium metal in 100 parts of 3-hydroxymethyl-2,4-dihydroxypentane ("sodium hexanetriolate") are further added as an accelerator to the mixture of epoxide resin A and N,N'-dimethylurea (111.7 g.) described in Example 1, before pouring into moulds.

Thereafter the mixture is cured in accordance with the temperature program described in Example 1, and mouldings with the following properties are obtained:

flexural strength (VSM 77,103)—14.4 kg./mm.²
deflection (VSM 77,103)—14.3 mm.
impact strength (VSM 77,103)—8.3 cm. kg./cm.²
boiling water absorption (1 hour)—0.95%
heat distortion point according to Martens—(DIN) 70° C.

EXAMPLE 3

100 g. of epoxide resin A according to Example 1 and 15.4 g. of N,N'-diethylurea (corresponding to a ratio of epoxide equivalents to mols of urea derivative=1:0.25) are well mixed at 100° C. and the resulting mixture is poured into aluminium moulds prewarmed to 100° C. The cure takes place in accordance with the following temperature program: 2 hours 100° C.+22 hours 110° C.+1 hour 120° C.+3 hours 130° C.+3 hours 130° C.+1 hour 150° C.+16 hours 160° C. The cured castings have the following properties:

flexural strength (VSM 77,103)—11.7 kg./mm.²
deflection (VSM 77,103)—16.9 mm.
impact strength (VSM 77,103)—8.8 cm. kg./cm.²
cold water absorption (4 days, 20° C., test specimen 60 x 10 x 4 mm.)—0.34%
heat distortion point according to Martens—(DIN) 61° C.

EXAMPLE 4

100 g. of epoxide resin A according to Example 1, with an epoxide content of 5.25 epoxide equivalents/kg., and 15.4 g. of N,N,N',N'-tetramethylurea are stirred at 100° C. to give a homogeneous mass and poured into aluminium moulds. The cure takes place in 3 hours at 120° C+2 hours 130° C.+3 hours 140° C.+3 hours 150° C.+16 hours 160° C. The mouldings thus obtained have the following properties:

flexural strength (VSM 77,103)—9.6 kg./mm.²
deflection (VSM 77,103)—5.2 mm.
impact strength (VSM 77,103)—11.2 cm./kg./cm.²
cold water absorption (4 days, 20° C.)—0.55%
heat distortion point according to Martens (DIN)—48° C.

EXAMPLE 5

100 g. of epoxide resin A according to Example 1 with an epoxide content of 5.25 equivalents/kg. and 6.55 g. of N-monomethylurea are mixed at 100° C. and the homogeneous melt is poured into aluminum moulds. The cure takes place in accordance with the following temperature program: 8 hours 100° C., 12 hours 105° C., 2 hours 120° C. and 16 hours 150° C.

Gelling occurs after the 2 hours at 120° C. The mouldings thus obtained have the following properties:

flexural strength (VSM 77,103)—13.7 kg./mm.²
deflection (VSM 77,103)—13.9 mm.
impact strength (VSM 77,103)—21.5 cm. kg./cm.²
boiling water absorption (1 hour, 100° C.)—0.65.
heat distortion point according to Martens (DIN)—90° C.

COMPARISON EXPERIMENTS

Experiments Ia to Ie

Attempts were made to manufacture castings from curable mixtures based on a conventional epoxide resin and an aromatic-substituted bis(urea) described as the curing agent in U.S. patent specification No. 3,386,955, varying the quantity ratio of resin:curing agent and the cure conditions.

Experiment Ia 76.2 g. of epoxide resin A (liquid diomethane-diglycidyl ether with an epoxide content of 5.25 epoxide equivalents/kg.) and 54.8 g. of 1,1'-(4-methyl-m-phenylene)-bis-(3,3-diethylurea) (corresponding to a ratio of equivalents of epoxide groups to mols of urea derivative=1:0.5) are stirred at 130° C. to give a homogeneous melt and poured into aluminium moulds prewarmed to 120° C. After about 20 minutes at 120° C. the mixture reacts strongly exothermically, with vigorous decomposition, so that no usable castings are obtainable.

Experiment Ib

A mixture of 41.2 g. of 1,1'-(4-methyl-m-phenylene)-bis-(3,3-diethylurea) and 85.4 g. of epoxide resin A (diomethane-diglycidyl ether with an epoxide content of 5.25 epoxide equivalent/kg.) (corresponding to a ratio of equivalent of epoxide group to mols of urea derivative=1:0.33) is stirred at 120–125° C. to ive a homogeneous paste, poured into an aluminium mould prewarmed to 125° C. and cured in accordance with the following temperature program: 1 hour 120° C., 1 hour 130° C., 1 hour 140° C. and 15 hours 150° C. The brown moulding thus obtained, which is permeated by many gas bubbles, breaks on removal from the mould; it shows no mechanical strength whatsoever.

Experiment Ic 10 g. of 1,1'-(4-methyl-m-phenylene)-bis-(3,3-diethylurea) and 100 g. of diomethane-diglycidyl ether (epoxide content of 5.25 epoxide equivalent/kg.) (quantity ratios in accordance with Example III of U.S. patent specification 3,386,955) are worked into a homogeneous melt at 95° C. and cured as described in Experiment Ib. The moulding thus obtained is completely permeated with gas bubbles; its mechanical properties are not measurable.

Experiment Id

The mixture described in Experiment Ic is cured for 22 hours at 100° C. The mixture gels in 6–8 hours. The mechanical properties of the casting cannot be measured because the casting is completely permeated by gas bubbles and cavities.

Experiment Ie

Experiment Id is repeated, but curing is continued for a further 24 hours at 150° C. The result is the same as in Experiment Id.

Experimental series IIa–IId

Attempts were made to obtain gelled or cured products from mixtures based on a conventional epoxide resin and N.N'-dicyclohexylurea, varying the quantity ratio of resin:cycloaliphatic urea derivative and the temperature program.

Four experiments IIa–IId were carried out, with epoxide resin A (epoxide content 5.25 epoxide equivalents/kg.) and N,N'-dicyclohexylurea being stirred in the quantity ratios indicated in Table 2 below, at 110° C., to give a mixture of pasty consistency. Here it does not prove possible to dissolve the dicyclohexylurea completely homogeneously in the epoxide resin even on increasing the temperature to 150° C.

TABLE 2

| | | | Experiment Number | |
|---|---|---|---|---|
| | IIa | IIb | IIc | IId |
| Epoxide resin A, parts | 100 | 70.4 | 80.0 | 76.2 |
| N,N'-dicyclohexylurea, parts | 10 | 40.3 | 31.4 | 22.4 |
| Equivalents of epoxide group: mol of dicyclohexylurea. | 1:0.08 | 1:0.5 | 1:0.33 | 1:0.25 |
| Cure conditions, hours/° C | 18 hours/105° C.<br>Plus 5 hours/150° C.<br>Plus 20 hours/170° C. | 1 hour/120° C.<br>Plus 1 hour/130° C.<br>Plus 1 hour 140° C.<br>Plus 15 hours/150° C.<br>Plus 24 hours/175° C. | Same as Experiment IIb | Same as Experiment IIb. |
| Result | No gelling viscous paste | No gelling, partial decomposition, after cooling hard and brittle masses devoid of mechanical strength. | | |

These experiments confirm the result of Example IV of U.S. patent specification 3,294,749, according to which N,N'-dicyclohexylurea under normal conditions for hot cure is of far too low a reactivity to produce gelling of the resin/urea mixture. Furthermore N,N'-dicyclohexylurea is still incompatible, even at 150° C., with the epoxide resin at the optimum mixing ratios found in the case of the alkylurea derivatives.

We claim:

1. A storage-stable, heat-curable composition of matter which comprises (a) a polyepoxide compound having an average of more than one vicinal epoxide group in the molecule and (b) as the curing agent, an alkylurea of formula

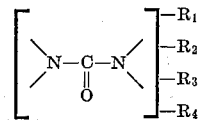

wherein $R_1$ denotes a lower alkyl group with 1 to 4 carbon atoms and $R_2$, $R_3$ and $R_4$ each represent a hydrogen atom or an alkyl group with 1 to 4 carbon atoms.

2. A composition according to claim 1 which contains a urea which is N-substituted by at least two $C_1$–$C_4$-alkyl groups as the curing agent (b).

3. A composition according to claim 2 which contains N,N'-dimethylurea, N,N'-diethylurea or N,N,N'N'-tetramethylurea as the curing agent (b).

4. A composition according to claim 1 which contains per 1 equivalent of epoxide groups of the polyepoxide compound (a) 0.2 to 0.7 mol of the alkylurea (b).

5. A composition according to claim 1 which contains a polyepoxide compound (a) having an average of more than one glycidyl group, β-methylglycidyl group or 2.3-epoxycyclopentyl group bonded to a hetero-atom in the molecule.

6. A composition according to claim 1 which contains a polyglycidyl ether of a polyhydric phenol as the polyepoxide compound (a).

7. A composition according to claim 6, which contains a polyglycidyl ether of 2,2-bis(p-hydroxy-phenyl)-propane as the polyepoxide compound (a).

8. A storage-stable, heat-curable composition of matter which comprises a curable and still fusible precondensate ("B-stage") of (a) a polyepoxide compound having an average of more than one vicinal epoxide group in the molecule and (b) an alkylurea of formula
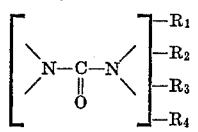
wherein $R_1$ denotes a lower alkyl group with 1 to 4 carbon atoms and $R_2$, $R_3$ and $R_4$ each represent a hydrogen atom or an alkyl group with 1 to 4 carbon atoms.
References Cited
WILLIAM H. SHORT, Primary Examiner
T. E. PERTILLA, Assistant Examiner
U.S. Cl. X.R.
117—161; 161—184; 260—2, 9, 28, 29.1, 37, 59, 77.5, 830